United States Patent
Keizi

[15] 3,679,918
[45] July 25, 1972

[54] SELF-EXCITING TYPE HIGH VOLTAGE GENERATING APPARATUS UTILIZING PIEZOLECTRIC VOLTAGE TRANSFORMING ELEMENTS

[72] Inventor: Inoue Keizi, Yokohama, Japan
[73] Assignee: Denki Onkyo Company Limited, Tokyo, Japan
[22] Filed: June 19, 1970
[21] Appl. No.: 47,759

[30] Foreign Application Priority Data

Dec. 30, 1969 Japan..............................44/105474

[52] U.S. Cl..................310/8.1, 310/8.2, 310/9.8, 331/163
[51] Int. Cl. ............................................H01v 7/00
[58] Field of Search..................310/8.1, 8.2, 9.8, 9.7, 8.9, 310/9.5, 9.6, 8, 8.3; 331/73, 163, 155, 112, 116, 158

[56] References Cited

UNITED STATES PATENTS

| | | | |
|---|---|---|---|
| 1,864,368 | 6/1932 | Nicalson | 331/163 X |
| 3,562,792 | 2/1971 | Berlincourt et al. | 310/8.1 |
| 3,516,645 | 6/1970 | Arndt | 310/8.1 X |
| 2,975,354 | 3/1961 | Rosen | 310/8.1 UX |
| 3,421,109 | 1/1969 | Wiggins et al. | 331/116 |
| 3,256,498 | 6/1966 | Hurtig | 331/155 X |
| 2,594,841 | 4/1952 | Arndt | 310/8.1 X |
| 2,859,346 | 11/1958 | Firestone et al. | 310/8.1 X |

*Primary Examiner*—J. V. Truhe
*Assistant Examiner*—B. A. Reynolds
*Attorney*—Chittick, Pfund, Birch, Samuels & Gauthier

[57] ABSTRACT

In a self-exciting type high voltage generating apparatus utilizing a piezoelectric voltage transforming element driven by an oscillator, a capacitive feedback circuit is provided between the output of the piezoelectric voltage transforming element and the oscillator to lock the oscillation frequency of the oscillator to the resonance frequency of the piezoelectric voltage transforming element.

4 Claims, 3 Drawing Figures

INVENTOR
KEIZI INOUE

ATTORNEY

SELF-EXCITING TYPE HIGH VOLTAGE GENERATING APPARATUS UTILIZING PIEZOLECTRIC VOLTAGE TRANSFORMING ELEMENTS

BACKGROUND OF THE INVENTION

This invention relates to a novel self-exciting type high voltage generating apparatus utilizing a piezoelectric voltage transforming element and having a unique synchronizing system.

As shown in FIG. 1 of the accompanying drawing, a high voltage generating apparatus utilizing a piezoelectric voltage transforming element generally comprises a piezoelectric voltage transforming element 1 provided with two drive electrodes 2 and 3 and an output electrode 4. The drive electrode 2 is connected to one terminal of a source of alternating current while the other drive electrode 3 is grounded. The output electrode 4 is connected to a high voltage rectifier circuit 12 which acts to multiply the output voltage by a factor of four and comprised by four diodes 6, 7, 8 and 9 and capacitors 10 and 11. A load 13 is connected to the output terminal of the high voltage rectifying circuit 12.

When an AC voltage of a predetermined frequency is applied across drive electrodes 2 and 3 of the piezoelectric voltage transforming element from an AC source 5 the piezoelectric voltage transforming element will resonate to produce at the output electrode 4 a high AC voltage which is about 200 to 300 times higher than the input voltage applied across drive electrodes 2 and 3. This high voltage is further stepped up and rectified by the high voltage rectifying circuit 12 to obtain a high DC voltage which is applied to load 13.

When compared with a conventional high voltage generating apparatus utilizing a step-up transformer the high voltage generating apparatus utilizing a piezoelectric voltage transforming element as described hereinabove enables one to use smaller circuit elements thus resulting in the miniaturization and decrease in the weight of the apparatus.

However, a conventional piezoelectric voltage transforming element is characterized by its ability of responding to a single frequency and limited frequencies close thereto. Consequently, when such an element is utilized as a high voltage generating apparatus it is necessary to pay special care to the construction of the AC source or the oscillator.

SUMMARY OF THE INVENTION

It is therefore an object of this invention to provide a novel synchronizing system for a self-excited type high voltage generating apparatus utilizing a piezoelectric voltage transforming element which can stabilize the oscillation frequency of the oscillator.

According to this invention, there is provided a self-exciting type high voltage generating apparatus comprising an oscillator, a piezoelectric voltage transforming element provided with a drive electrode and an output electrode, means for coupling the output from the oscillator to the drive electrode, and a capacitive feedback circuit for feeding the output appearing at the output electrode back to the oscillator whereby to lock the oscillation frequency of the oscillator to the resonance frequency of the piezoelectric voltage transforming element. The capacitive feedback circuit may be constituted by a capacitor of small capacitance and in some case may be comprised by the stray capacitance of the apparatus.

BRIEF DESCRIPTION OF THE DRAWING

The invention will be better understood and the various objects and advantages will be more fully appreciated from the following description taken in conjunction with the accompanying drawing in which.

DESCRIPTION OF THE PREFERRED EMBODIMENTS

Figure 1:
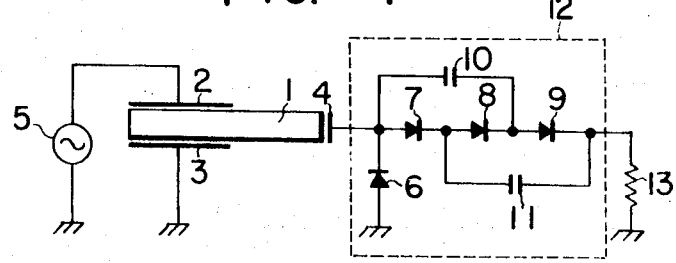
FIG. 1 shows an electrical connection to explain the principle of operation of a high voltage generating apparatus utilizing a piezoelectric voltage transforming element.
Figure 2:
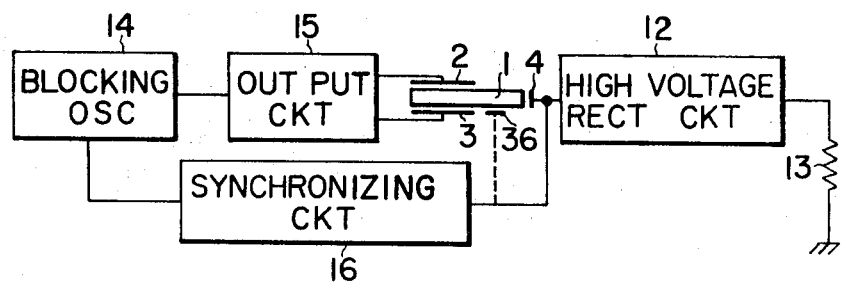
FIG. 2 is a block diagram to explain the principle of a synchronizing system of a self-exciting type high voltage generating apparatus utilizing a piezoelectric voltage transforming element and embodying this invention and FIG. 3 shown a detailed connection diagram of the embodiment shown in FIG. 2.

Referring now to FIG. 2 of the accompanying drawing which shows the principle of the novel synchronizing system of a self-exciting type high voltage generating apparatus utilizing a piezoelectric voltage transforming element and in which corresponding elements are designated by the same reference numerals as in FIG. 1, there is provided an oscillator 14 comprising a blocking oscillator, a nonstable multivibrator or the like. The output of the oscillator 14 is coupled to a horizontal deflection circuit 15 of a television receiver, for example, and the output of the circuit 15 is impressed across a pair of drive electrodes 2 and 3 of a piezoelectric voltage transforming element 1. A portion of the output from the output electrode 4 of the piezoelectric voltage transforming element is supplied to a synchronizing circuit 16 in accordance with this invention and the output from the synchronizing circuit is fed back to the oscillator 4.

In operation, the oscillation frequency of the oscillator 14 is set to be slightly lower than the resonance frequency of the piezoelectric voltage transforming element. The synchronizing circuit is usually comprised by a capacitor of small capacitance.

As the piezoelectric voltage transforming element 1 is driven by oscillator 14 through output circuit 15, a high AC voltage of an inherent oscillation frequency of the element will be induced at the output terminal 4 thereof. After being stepped up and rectified by the high voltage rectifying circuit 12, this voltage is supplied to load 13. A portion of the AC voltage appearing at the output electrode 4 of the piezoelectric voltage transforming element is fed back to the oscillator 14 through the synchronizing circuit 16 to forcibly synchronize the oscillation frequency of the oscillator with the resonance frequency of the piezoelectric voltage transforming element 1.

Figure 3:
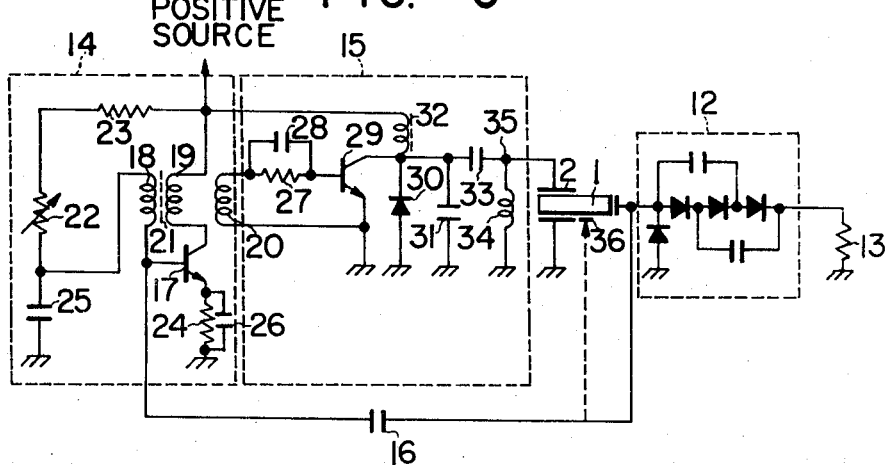

FIG. 3 shows the detail of the circuit construction of the block diagram shown in FIG. 2. In FIG. 3, the oscillator 14 is shown as a blocking oscillator comprising an NPN-type transistor 17, a transformer 21 having a primary winding 18, a secondary winding 19 and a tertiary winding 20, resistors 22, 23 and 24 and capacitors 25 and 26. One end of a capacitor 16 that comprises the synchronizing circuit is connected to the base electrode of transistor 17.

The output circuit 15 comprises a NPN-type transistor 29. To the base electrode thereof is applied the signal taken from the tertiary winding 20 of the transformer 21 in the oscillator 14 through a resistor 27 and a capacitor 28 which are connected in parallel. The emitter electrode of transistor 29 is grounded, and a diode 30 and a capacitor 31 are connected in parallel across the collector electrode of transistor 29 and the ground. The diode 30 serves to ground a portion of the output of the collector output of transistor 29 for the purpose of lowering the reverse breakdown voltage thereof. A tank coil 32 is connected between the collector electrode of transistor 29 and its positive source of supply to form a resonance circuit together with capacitor 31 to form a fly-back pulse. Further, a series resonance circuit comprised by a capacitor 33 and an inductance coil 34 is connected between the collector electrode of transistor 29 and the ground. This series resonance circuit has a resonance frequency equal to the resonance frequency of the piezoelectric voltage transforming element. A drive signal appearing at the juncture 35 between capacitor 33 and coil 34 of the series resonance circuit is impressed upon a drive electrode 2 of the piezoelectric voltage transforming element.

Although in this embodiment an output signal derived from the output electrode 4 of the piezoelectric voltage transforming element 1 is fed back to the oscillator through synchronizing circuit 16, as shown by dotted lines in FIG. 3, such a feedback signal may be taken from a feedback electrode 36 specially provided for the piezoelectric voltage transforming element 1.

In this embodiment, a considerably high voltage is produced on the output side of the piezoelectric voltage transforming element. For this reason, it is necessary to make sufficiently small the capacitance of the capacitor comprising the synchronizing circuit. Otherwise a voltage higher than the insulating strength will be impressed upon transistor 17 of oscillator 14 to damage the same. For this reason, in some cases it is advantageous to use a capacitor having a capacitance of the order of several picofarad. In such a case, the stray capacitance of the apparatus may be used. More particularly, so long as the oscillation frequency of the oscillator lies within a range capable of driving the piezoelectric voltage transforming element 1, the first oscillation will drive the piezoelectric voltage transforming element 1 and the output voltage thereof will be fed back to the base electrode of transistor 17 of oscillator 14 thus locking the oscillation frequency of the oscillator to the resonance frequency of the piezoelectric voltage transforming element.

Furthermore, while in the embodiment, the high voltage rectifying circuit 12 was shown as the type that can multiply the voltage by a factor of four it is to be understood that any other circuit that can multiply the voltage by any factor may also be used.

As above described, this invention provides a novel self-exciting high voltage generating apparatus utilizing a piezoelectric voltage transforming element and provided with an efficient synchronizing circuit that can lock the oscillation frequency of the oscillator to the resonance frequency of the piezoelectric voltage transforming element.

While I have shown and described in detail two forms of my invention by way of illustration, many modifications will undoubtedly occur to those skilled in the art. I therefore contemplate by the concluding portion of this specification to cover all such modifications as fall within the true spirit and scope of my invention.

What is claimed is:

1. A self-exciting type high voltage generating apparatus comprising a piezoelectric voltage transforming element provided with a drive electrode and an output electrode, an oscillator having frequency determining elements establishing the oscillator frequency at a frequency corresponding to the resonant frequency of the piezoelectric element, means for coupling the output from said oscillator to said drive electrode so that said piezoelectric element produces an output voltage at its output electrode which is substantially higher than the voltage applied by said oscillator to its drive electrode, and a capacitive feedback circuit for feeding the output appearing at said output electrode back to said oscillator whereby to lock the oscillation frequency of said oscillator to the resonance frequency of said piezoelectric voltage transforming element, said feedback circuit comprising a capacitor of small capacitance and high impedance relative to the input impedance of the point to which the feedback voltage is applied to avoid damaging said point and minimize loading of said element.

2. The self-exciting type high voltage generator as claimed in claim 1 wherein the oscillator and the piezoelectric element are arranged to form such capacitor by means of the stray capacitance existing between said oscillator and said piezoelectric element.

3. The self-exciting type high voltage generator as claimed in claim 1 wherein the output from said piezoelectric voltage transforming element is stepped up and rectified.

4. The self-exciting type high voltage generator as claimed in claim 1 wherein said oscillator comprises a blocking oscillator having a transistor connected therein to which the feedback from the piezoelectric element is applied.

* * * * *